United States Patent
Wu et al.

(10) Patent No.: US 7,234,119 B2
(45) Date of Patent: Jun. 19, 2007

(54) DEVICE AND METHOD FOR EDITING PROCESSED DATA INPUT

(75) Inventors: Charles Yimin Wu, Palo Alto, CA (US); Jin Guo, Sunnyvale, CA (US); Sadik Kapadia, Sunnyvale, CA (US)

(73) Assignee: Motorola Inc., Schaumburg, IL (US)

( * ) Notice: Subject to any disclaimer, the term of this patent is extended or adjusted under 35 U.S.C. 154(b) by 93 days.

(21) Appl. No.: 10/308,797

(22) Filed: Dec. 3, 2002

(65) Prior Publication Data

US 2004/0104936 A1 Jun. 3, 2004

(51) Int. Cl.
*G06F 3/00* (2006.01)

(52) U.S. Cl. ................................... 715/864

(58) Field of Classification Search ............... 345/814, 345/864, 710, 802, 728; 715/816, 864
See application file for complete search history.

(56) References Cited

U.S. PATENT DOCUMENTS

| | | | | |
|---|---|---|---|---|
| 4,763,356 A | * | 8/1988 | Day et al. .................... | 379/368 |
| 5,159,664 A | * | 10/1992 | Yamamoto et al. ......... | 345/629 |
| 5,363,481 A | * | 11/1994 | Tilt ............................. | 345/814 |
| 5,500,923 A | * | 3/1996 | Kuroshima et al. ......... | 358/1.15 |
| 5,974,161 A | * | 10/1999 | York ........................... | 382/119 |
| 6,084,598 A | * | 7/2000 | Chekerylla ................... | 345/441 |
| 6,243,071 B1 | * | 6/2001 | Shwarts et al. .............. | 715/823 |
| 6,424,357 B1 | * | 7/2002 | Frulla et al. ................. | 345/728 |
| 6,791,537 B1 | * | 9/2004 | Shim et al. .................. | 345/173 |
| 6,810,272 B2 | * | 10/2004 | Kraft et al. .................. | 455/566 |
| 6,944,472 B1 | * | 9/2005 | Ishigami ..................... | 455/550.1 |
| 2006/0088216 A1 | * | 4/2006 | Kawamura et al. .......... | 382/187 |

OTHER PUBLICATIONS

Screen Dumps of Microsoft Word (2000, pp. 1-6).*

* cited by examiner

*Primary Examiner*—Kristine Kincaid
*Assistant Examiner*—Lê Nguyen
(74) *Attorney, Agent, or Firm*—Hisashi D. Watanabe

(57) ABSTRACT

A portable electronic device (100) and method (400) is capable of editing processed data input. The portable electronic device (100) comprises a display area (224) and a processor (206) coupled to the display area. The device collects (404) data input and, then, removes (412) the data input from the display area in response to detecting (406) an input delay. Thereafter, the processor, in response to receiving (416) an undo command message, provides (426) the data input and/or a processed version of the data input to the display area.

9 Claims, 5 Drawing Sheets

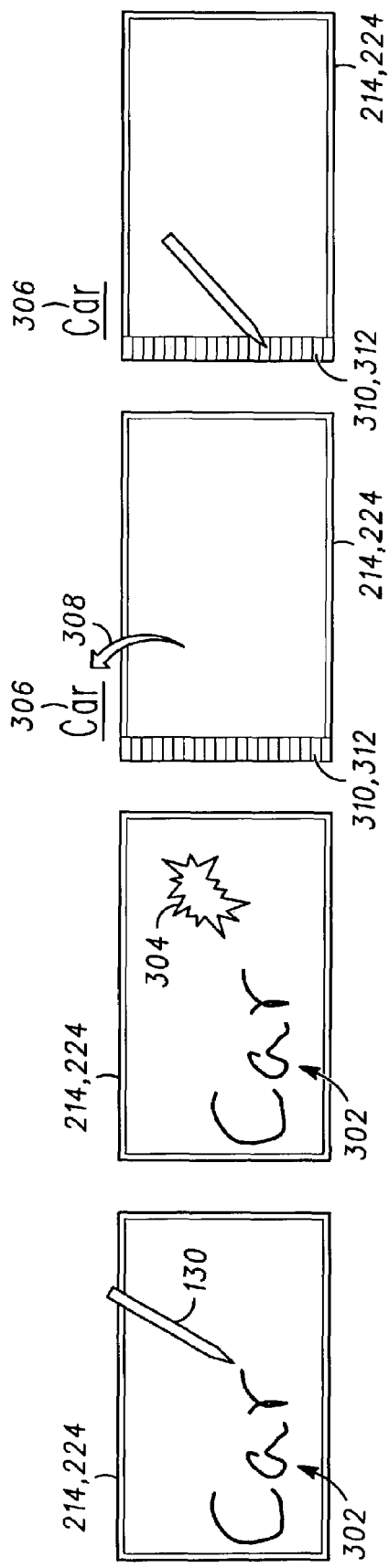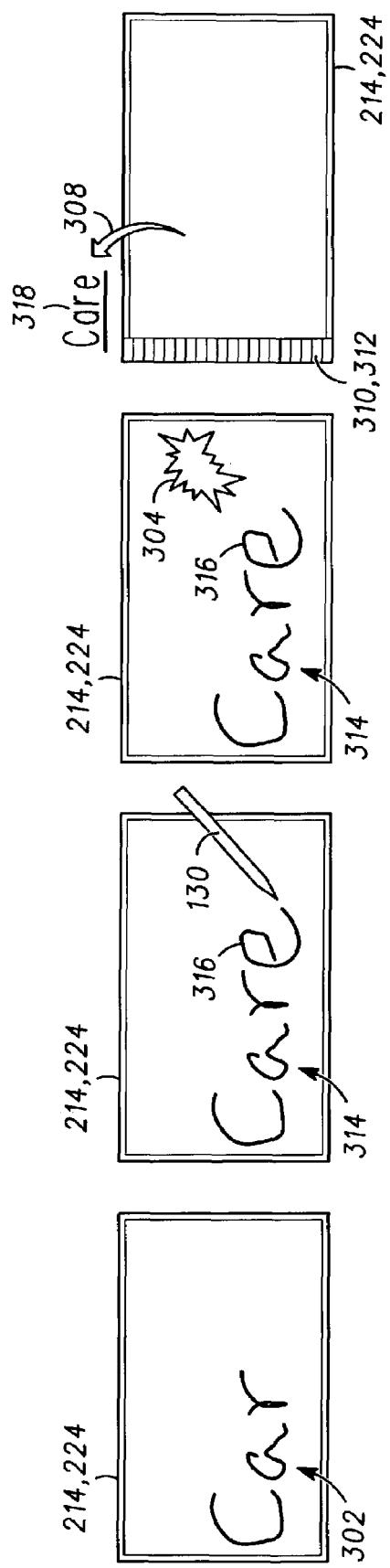

DEVICE AND METHOD FOR EDITING PROCESSED DATA INPUT

FIELD OF THE INVENTION

The present invention relates to the field of data entry systems that provide convenient processes for data input to a user interface. More specifically, the present invention relates to electronic devices having recognition systems for processing data input to determine characters, words and phrases.

BACKGROUND OF THE INVENTION

Text information may be entered into an electronic device in various ways. For example, a user may hand write characters on a touch pad or touch screen of the device, make key selections at a keypad of the device, and speak characters or words into a microphone of the device. The device includes a display to provide the user with feedback regarding the received data input. Also, a recognition system of the device converts the handwritten characters, the key selections, and the spoken characters or words to a data format that is readily recognizable by other components of the device.

The recognition system may include a timeout feature when a user pauses during data entry. Such system processes the received data and removes the feedback information from the display, regardless of whether the user has actually completed data entry. If the timeout condition occurs before the user completes the data entry, which often occurs when the user ponders or hesitates, the user must explicitly delete the previous partial recognition result and enter the data again. In this manner, the recognition system processes data prematurely and requires the user to follow a multi-step correction process with a high cognitive burden, which frustrates the user. Accordingly, there is a need for a system and method for editing data input that minimizes the frustrations common with premature timeout features.

BRIEF DESCRIPTION OF THE DRAWINGS

FIGS. 3A through 3H represent screens of a first preferred embodiment in accordance with the present invention.

DETAILED DESCRIPTION OF THE PREFERRED EMBODIMENTS

The present invention is a method for editing processed data input by a portable electronic device having a display area. A data input is collected and, then, an input delay is detected. The data input is removed from the display area in response to detecting the input delay. Next, an undo command input is received. Thereafter, the data input and/or a processed version of the data input is provided to the display area.

The present invention is also a portable electronic device comprising a display area and a processor coupled to the display area. The processor is configured to remove a data input from the display area in response to detecting an input delay. The processor is also configured to, subsequently, provide the data input and/or a processed version of the data input to the display area in response to receiving an undo command input.

Figure 1:
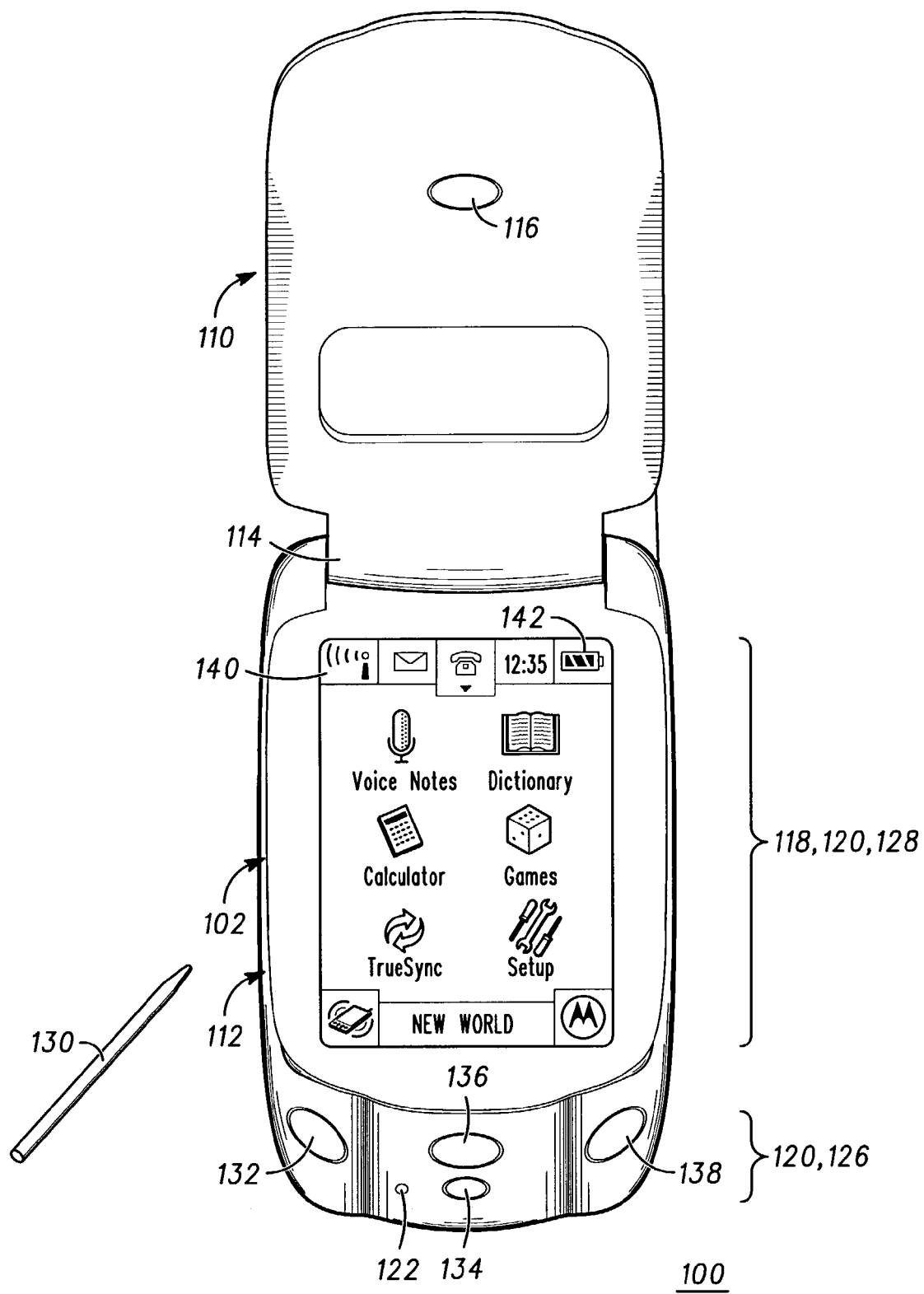
FIG. 1 is a perspective view of an exemplary portable electronic device in accordance with the present invention.

Referring to FIG. 1, there is shown an exemplary portable electronic device 100 having a user interface 102 in accordance with the present invention. The portable electronic device 100 is any type of device that may benefit from a user interface 102 of a data entry system for text input (and, thus, is generically represented by FIG. 2). For example, the device may be, but is not limited to, a radiotelephone (such as a cellular phone or two-way radio), a paging device, a personal digital assistant ("PDA"), a handheld computer, an audio/video device (such as a television or an MP3 player), a network browsing device, a tablet for pen, a touchpad for finger and pen, a touch keypad for finger, a virtual pen, and any type of computer having a limited number of input keys.

FIG. 1 shows a foldable, portable electronic device 100 having a top section 110 and a bottom section 112 movably joined at a joint section 114. The top section 110 includes an earpiece aperture 116, and the bottom section 112 includes a display 118, a user input device 120, and a microphone aperture 122. The device 100 also includes other components of a PDA (shown in FIG. 2) as described below, such as an antenna, power supply, external connectors, additional controls, and the like.

The user input device 120 of the present invention may be any type of input device that permits a user to provide data to the device 100. For example, the user input device 120 may be a touch screen that is transparent or translucent, a touch pad that is opaque, a keypad having a plurality of numeric keys, a plurality of selection keys and/or an audio input. The touch screen and the touch pad may be used to receive handwritten entries or key selection entries. For example, the device 100 may recognize a character handwritten on the touch screen or touch pad, or recognize a character that corresponds to a particular contact point of the touch screen or touch pad. Contact may be made by a user's finger or a pointing device 130. Similarly, the keypad and plurality of selection keys may be used to receive handwritten entries or key selection entries. For example, the device 100 may recognize a character handwritten on or above the keypad or keys (using, for example, a capacitive detection sensor), or recognize a character or set of characters that correspond to a particular key. The audio input may be used to receive voice entries, such as spoken characters, words, phrases, and related sounds.

For the preferred embodiment, the user input device 120 includes function keys 126 and a touch screen 128. For the device 100 shown in FIG. 1, the function keys 126 are located at a lower portion of the bottom section 112 and include menu selection keys 132, 134, 136, 138. The function keys 126 of the present invention are not limited to those provided for the device 100 and may include other programmed or user-programmable control buttons such as directional keys, message handling keys, memory keys, a call answer/termination keys, clear/delete keys, volume control keys, voice recording keys, device setup controls, and the like. Also, a wide variety of symbols may be entered into the user interface 102 of the device 100, such as Roman characters, phonetic characters, ideographic characters, and strokes of characters. Thus, the input mode of the device 100 may be determined by selection of one or more function keys, such as the menu selection keys 132, 134, 136, 138.

The touch screen 128 of the preferred embodiment is located at a middle portion of the bottom section 112 and overlays the display 118. The touch screen 128 may overlay the entire display 118, as shown in FIG. 1, or one or more parts of the display. In the alternative, although not shown in FIG. 1, the touch screen 128 may be located adjacent to the display 118. The display 118 of the device 100 provides various types of information to the user. Certain indicators are provided for general operation of the device 100, such as the signal strength indicator 140 and power indicator 142 of the device.

Figure 2:
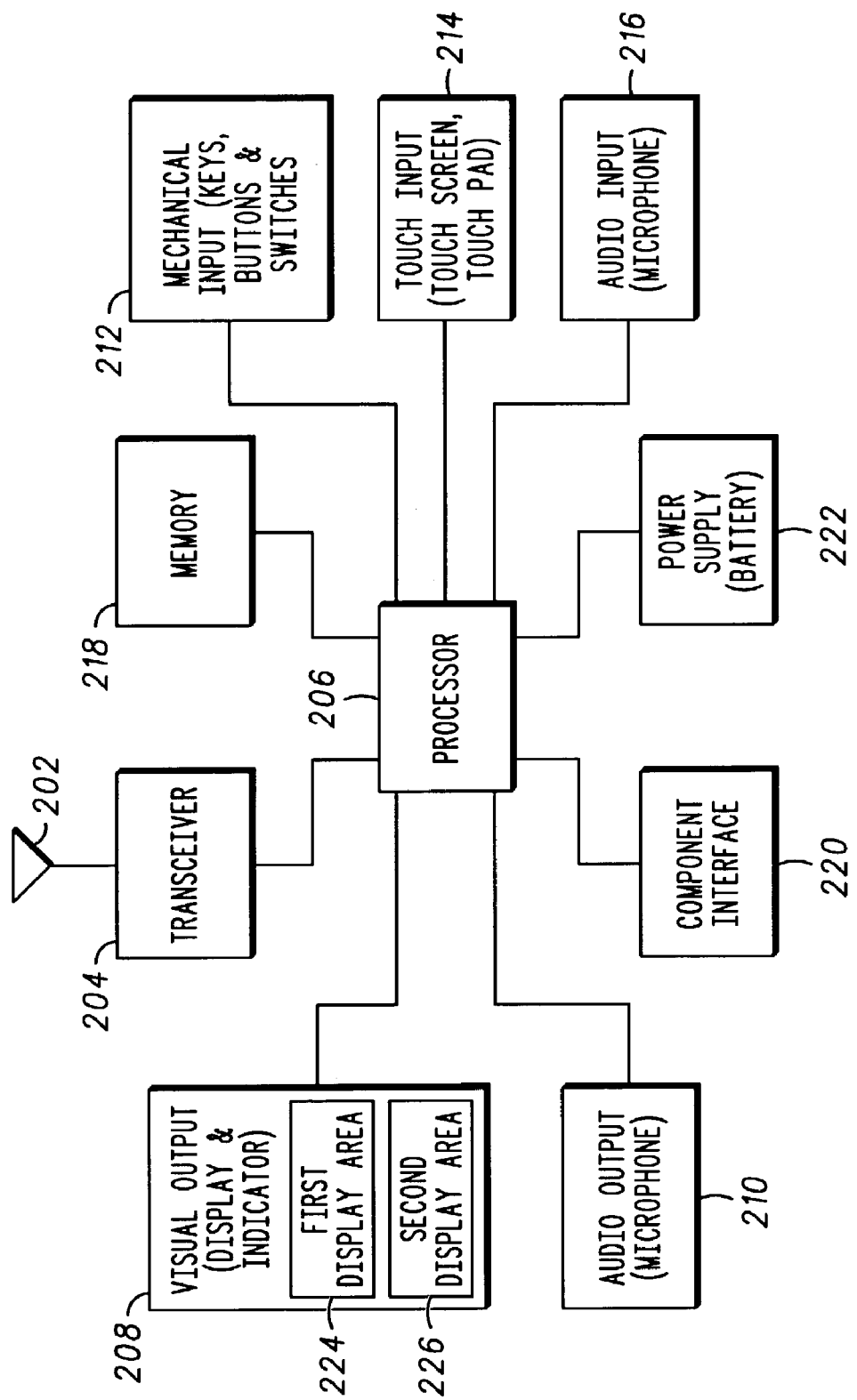
FIG. 2 is a block diagram of internal components of the portable electronic device of FIG. 1.

Referring to FIG. 2, internal components 200 of the portable electronic device 100 are shown. The preferred embodiment includes an antenna 202; a transceiver 204; a processor 206; output devices 208, 210; and input devices 212, 214, 216. Upon reception of wireless signals, the internal components 200 detect the signals through the antenna 202 to producing detected voice and/or data signals. The transceiver 204, coupled to the antenna 202, converts the detected signals into electrical baseband signals and demodulates the electrical baseband signals to recover incoming information, such as voice and/or data, transmitted by the wireless signals. After receiving the incoming information from the transceiver 204, the processor 206 formats the incoming information for output to the output devices 208, 210. Likewise, for transmission of wireless signals, the processor 206 formats outgoing information and conveys it to the transceiver 204 for modulation of a carrier and conversion into modulated signals. The transceiver 204 conveys the modulated signals to the antenna 202 for transmission to a remote transceiver (not shown).

The input and output devices may include a variety of visual, audio and/or motion devices. The output devices may include, but are not limited to, visual outputs 208 (such as liquid crystal displays and light emitting diode indicators), audio outputs 210 (such as speakers, alarms and buzzers), and motion outputs (such as vibrating mechanisms). The input devices may include, but are not limited to, mechanical inputs 212 (such as keyboards, keypads, selection buttons, touch pads, capacitive sensors, motions sensors, and switches), touch input 214 (such as touch screens and touch pads) and audio inputs 216 (such as microphones). For example, the top and/or bottom sections 112, 114 of the device 100 may includes a switch that is responsive to movement of the sections relative to each other and actuates one or more functions of the device as a result.

The internal components 200 of the portable electronic device 100 further include a memory portion 218 for storing and retrieving data. The processor 206 may perform various operations to store, manipulate and retrieve information in the memory portion 218. For example, the processor 206 may search the memory 226 for previously stored data input or processed information upon receiving a command from one or more input devices 212, 214, 216. After the data input or processed information is found, it is provided to the output devices 208, 210 and/or further processed by the processor 206.

The internal components 200 of the portable electronic device 100 may further include a component interface 220 and a power supply 222. Accessories and additional components may be coupled to the component interface 220 to provide additional functionality and capabilities to the device 100. The power supply 222 provides power to the internal components 200 so that they may function correctly, such as a battery.

The visual output 208 of the output devices may include more than one display area. For the preferred embodiments, a first display area 224 shows the data input and/or a processed version of the data input that is being entered by a user whereas a second display are 226 shows the data input and/or a processed version of the data input that has been previously entered by the user. Therefore, the first display area 224 indicates the present state of data being entered, and the second display are 226 indicates the present state of data that has been entered and processed. The first and second display areas may be provided on separate displays or on different portions of the same display.

Referring to FIGS. 3A through 3H, a series of screens is shown representing a first preferred embodiment in accordance with the present invention. The present invention provides the capability of performing an undo action after a timeout action has occurred. For example, during the timeout action, the device may receive input, a timeout may occur for the device, the device may recognize the received input, and the device may display the recognized received input. Subsequently, during an undo action the device may essentially "undo's" the timeout and its subsequent actions (i.e., recognition and display of recognition) so that the device may continue to receive input.

The undo action may be either explicit or implicit. Explicit actions include, but are not limited to, button actions and gesture actions. For button actions, a user may perform a soft button click in which a designated region on the device is clicked or touched; a hard button click in which a physical switch is actuated; or ball/wheel is rotated. For gesture actions, a user may perform a pen gesture in which a tick, a clockwise circle, or a counter-clockwise circle is drawn; a motion gesture in which the device is shaken to actuate an embedded motion sensor; or a squeeze gesture in which the device is squeezed to actuate a mounted pressure sensor.

Implicit actions define a designated normal input pattern and identifies a need to permit incremental additions to an initial input (as opposed to input of a new letter, word or character) when a user's action departs from the normal input pattern. Implicit actions include, but are not limited to, another timeout or navigation actions. For another timeout, the device automatically brings input data back to a display to permit the user to continue input, but the user allows the device to timeout a second time by supplying no further input. For example, in a typical situation, a device may receive initial input, perform a timeout, recognize the initial input, and display a recognized result instead of the initial input. Of course, the recognized results is only displayed for a predetermined time before the device performs a timeout of the second time. If subsequent input is received before the second timeout, then the device may identify the subsequent input as a new letter, word or character. On the other hand, if the device performs a second timeout before subsequent input is received, then the device may return the initial input by displaying the initial input instead of the recognized result. When the initial input is displayed, the device may identify the subsequent input as an incremental addition to the initial input. The device may continue to update the initial input in the fashion until a new letter, word or character is entered (as described above) or a candidate from a list of candidates is selected. For navigation actions, an action other than a candidate selection action may be used. Examples include an explicit action to a pull-down candidate list in which an indicator adjacent to an otherwise closed pull-down menu is actuated or a candidate list navigation action in which the list is scrolled or paged up or down.

It should be noted that a user may edit data input before a timeout occurs. For example, before a timeout occurs, a last stroke of data input may be removed during data entry by using a predefined finger or pen gesture for stroke deletion, such as a right-to-left gesture.

For the first part of this first preferred embodiment, represented by FIGS. 3A through 3C, a Roman word is partially entered by a user before a timeout condition occurs and removes the partial word from the display area 224. In FIG. 3A, a user enters the first part of a word, namely the partial word "Car" 302 which is the first three letters of the full word "Care". For the preferred embodiments, the touch input 214 is provide above, and thus overlays, the display area 224 so that the device 100 can track movement of the pointing device 130. Thus, the device 100 can identify the shape of the character that is being entered and provide such information to the display area 224. In FIG. 3B, the user pauses and exceeds a predetermined time period without providing any data input to the touch input 214. Although the timeout condition is represented as a mark 304 in FIG. 3B, this mark does not appear on the display area 224 for the preferred embodiments. In FIG. 3C, the device 100 of the first preferred embodiment attempts to recognize the partial word 302 and generates a processed version 306 of the partial word. In this step, the partial word is removed from the display area 224. The partial word 302 and/or its processed version 306 is stored in the memory portion 218 (shown in FIG. 2) and, optionally, provided to the second display area 226. Although the recognition condition is represented as an arrow 308, this arrow does not appear on the display area 224 for the preferred embodiments.

As shown in FIG. 3C, for the preferred embodiments, an undo indicator 310 appears on a portion of the display area 224. This undo indicator 310 may appear at any part of the display area 224 including, but not limited to, the left-hand border (as shown in FIG. 3C), the right-hand border, the top border, the bottom border, the upper left corner, the lower left corner, the upper right corner and the lower right corner of the display area 224. Also, activation areas 312 of the touch input 214 may correspond to the undo indicators 310 of the display area 224. For example, the activation area 312 overlays the undo indicator 310 in FIG. 3C. However, it is to be understood that, as an alternative, the undo indicator 310 and activation area 312 may be a selection button that is not a part of the display area 224.

For the second part of this first preferred embodiment, represented by FTC. 3D, an undo actuator is activated. For example, when the user moves the pointing device 130 within proximity of the activation area 312, adjacent to the undo indicator 310, the subsequent steps represented by FIGS. 3E through 3H are followed. If, instead, the user moves the pointing device 130 on or over the remainder of the activation 312, then the device 100 will allow the user to enter a new character or word. It should be noted that, for one embodiment, an undo actuator may be active after the processor detects the input delay and may be inactive after the processor receives the undo command input.

For the third part of this first preferred embodiment, represented by FIGS. 3E through 3H, the partial word is returned to the display area 224 and the user completes the full word before another timeout condition occurs and removes the full word from the display area. In FIG. 3E, the device 100 retrieves the partial word 302 from the memory portion 218 and returns the partial word back to the display area 224 in response to activating the activation area 312. Although the partial word 302 is shown in FIG. 3E, the device 100 may instead retrieve the partial word 302 from the memory portion 218 and return the processed version 306 of the partial word to the display area 224. In FIG. 3F, the user enters the last part of the full word "Care" 314, namely the character "e" 316. In FIG. 3G, the user again pauses and exceeds a predetermined time period without providing any data input to the touch input 214. In FIG. 3H, the device 100 of the first preferred embodiment attempts to recognize the full word 314 and generates a processed version 318 of the full word. In this step, the full 314 word is removed from the display area 224. The full word 314 and/or its processed version 316 is stored in the memory portion 218 and, optionally, provided to the second display area 226.

Figure 4:
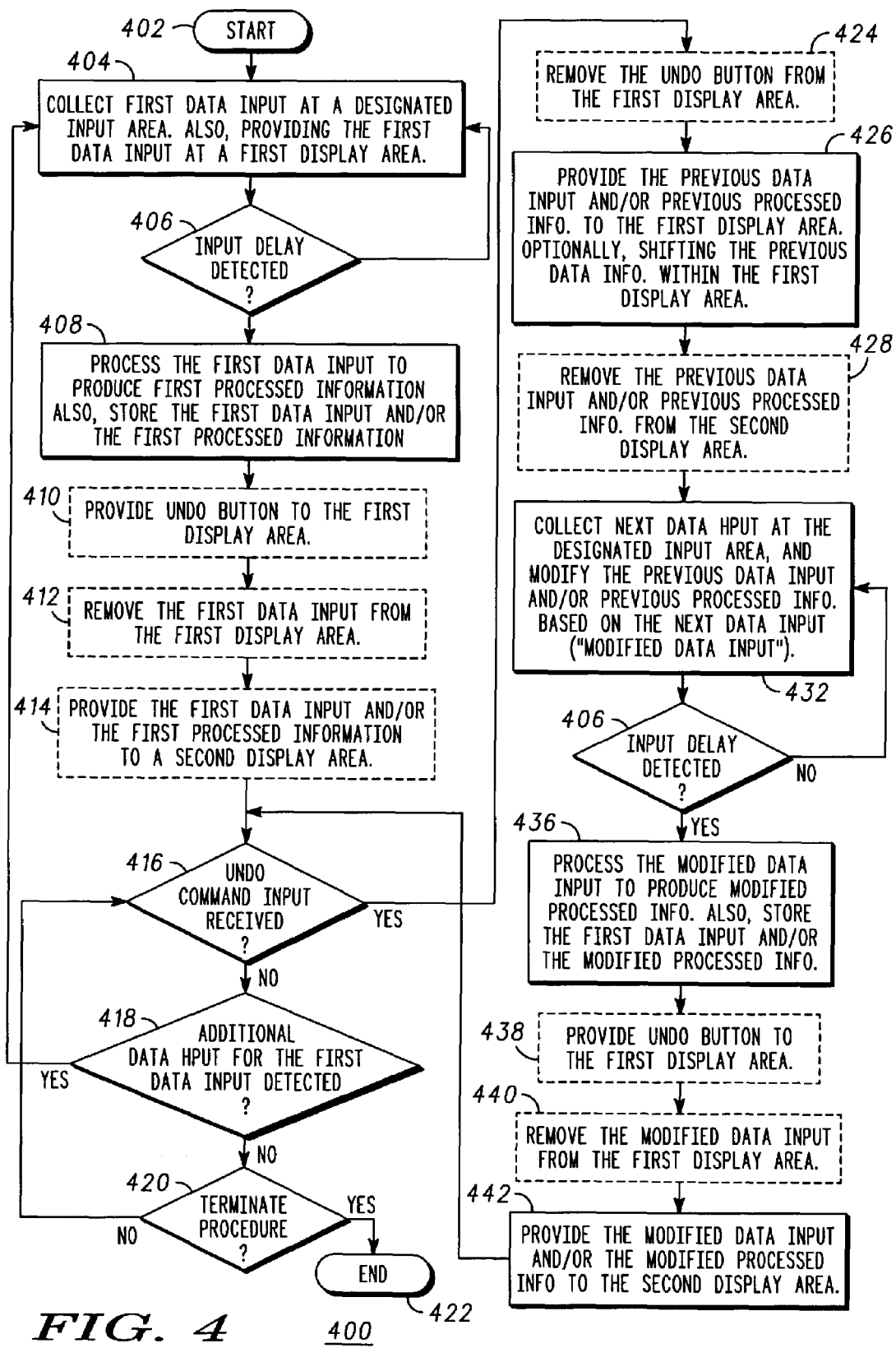
FIG. 4 is a flow diagram of the preferred embodiments represented by FIGS. 3A through 3H (as well as FIGS. 5A through 5C and FIG. 6).

Referring to FIG. 4 in conjunction with FIGS. 2 and 3, the operation of the internal components 200 of the portable electronic device 100 is represented. After starting at step 402, one or more input devices 212, 214, 216 collect first data input at a designated input area and provide the first data input to the processor 206 at step 404. Also, the processor 206 provides the first data input to the first display area 224. The processor 206 then determines whether an input delay is detected at step 406. If the processor 206 determines that a predetermined time period, for example, one second, of inactivity for collecting the data input has been exceeded, then the processor 206 proceeds to step 408. Otherwise, the processor 206 continues to collect the first data input at the designated input area. The processor 206 processes the first data input to produce first processed information at step 408. The first processed information is closer to (if not the same as) the native language of the processor 206 than the first data input. In an alternative embodiment, the processor 206 may provide an undo indicator 310 to the first display area 224 and activate the undo feature at step 410. Thereafter, the first data input is removed from the first display area 224 at step 412. Also, in an alternative embodiment, the processor 206 may provide the first data input and/or the first processed information to a second display area 226 at step 414.

At this point, the processor 206 waits for one of three conditions to occur. If the processor 206 receives an undo command input from an activation area 312 at step 416, then the processor proceeds with subsequent steps (i.e., steps 424 through 442) to edit processed data input. If the processor 206 detects additional data input at the designated input area outside of the activation area 312 at step 418, then the processor collects new data input at step 404. Although not shown in FIG. 4, the processor 206 may remove the undo indicator 310 from the first display area 224 and inactivate undo feature as well as remove the first data input and/or the first processed information from the second display area 226 if they were previously added at steps 410 and 414. If the processor 206 determines that the procedure shown in FIG. 4 is to be terminated at step 420, then the procedure ends at step 422. Preferably, the processor 206 continues to loop through steps 416, 418, 420, until one of the above conditions exist.

In response to receiving an undo command input from an activation area 312, the processor 206 may optionally remove the undo indicator 310 from the first display area 224 and inactivate the undo feature at step 424 if this undo indicator was previously provided at step 410. The processor 206, in response to receiving the undo command input, provides the first data input and/or first processed information to the first display area 224 at step 426. The processor 206 may remove the first data input and/or first processed information from the second display area 226 at step 428 if this data or information was previously provided at step 414. Thereafter, the processor 206 collects the next data input at the designated input area and modifies the first data input and/or first processed information based on the collected next data input ("modified data input").

The processor 206 then determines whether another input delay, similar to the one at step 406, is detected at step 434. If the processor 206 determines that the predetermined time period of inactivity for collecting the data input has been exceeded, then the processor 206 proceeds to step 436. Otherwise, the processor 206 continues to collect the modified data input at the designated input area. Next, the processor 206 processes the modified data input to produce modified processed information at step 436. Similar to the first processed information, the modified processed information is closer to (if not the same as) the native language of the processor 206 than the first data input and/or the next data input. In an alternative embodiment, the processor 206 may again provide the undo indicator 310 to the first display area 224 and activate the undo feature at step 438. The processor 206 removes the first data input from the first display area 224 at step 440. Also, in an alternative embodiment, the processor 206 may provide the modified data input and/or the modified processed information to a second display area 226 at step 442.

Once again, the processor 206 waits for one of three conditions to occur. If the processor 206 receives another undo command input from an activation area 312 at step 416, then the processor returns to steps 424 through 442 to further edit processed data input. Of course, this time, the processor 206 is modifying previous data input and/or previous processed information instead of first data input and/or first processed information. If the processor 206 detects additional data input at the designated input area outside of the activation area 312 at step 418, then the processor collects new data input at step 404. If the processor 206 determines that the procedure shown in FIG. 4 is to be terminated at step 420, then the procedure ends at step 422. Preferably, the processor 206 continues to loop through steps 416, 444, 420, until one of the above conditions exist.

Figure 5A:
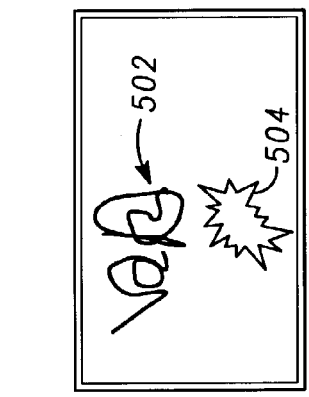
FIGS. 5A through 5C represent more screens of the first preferred embodiment in accordance with the present invention.
Figure 5B:
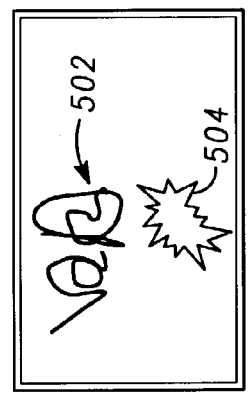
Figure 5C:
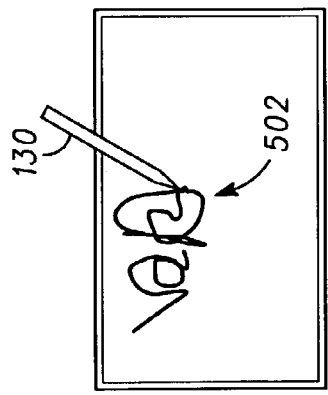

Referring to FIGS. 5A through 5C, a shortened series of screens is shown representing a first preferred embodiment when the device 100 received non-Roman characters, such as Asian stoke, phonetic, or ideographic characters. Since entry of non-Roman characters is substantially similar to entry of Roman characters, the procedure represented by FIGS. 5A through 5C is substantially similar to the procedure represented by FIGS. 3A through 3H. Accordingly, only a few screens representing entry of non-Roman characters are shown by FIGS. 5A through 5C. For example, in FIG. 5A, a partial portion 502 of a non-Roman character intended to be entered by a user. In FIG. 5B, the user pauses and exceeds a predetermined time period without providing any data input to the touch input 214 and, thus, failing to complete the non-Roman character. Again, the mark 504 representing the timeout condition is shown in FIG. 5B but does not actually appear on the display area 224 for the preferred embodiments. In FIG. 5C, the user adds the last portion 506 of the non-Roman character intended to be entered by the user. As shown by example in FIG. 5C, data entry may occur vertically as well as horizontally and, thus, the present invention may apply to a wide variety of directions for data entry, such as up-down, down-up, left-right, right-left, and angular directions. In accordance with the present invention, the steps for editing processed data entry as described herein shall apply to data entry and editing of data input shall apply to non-Roman characters.

Figure 6:
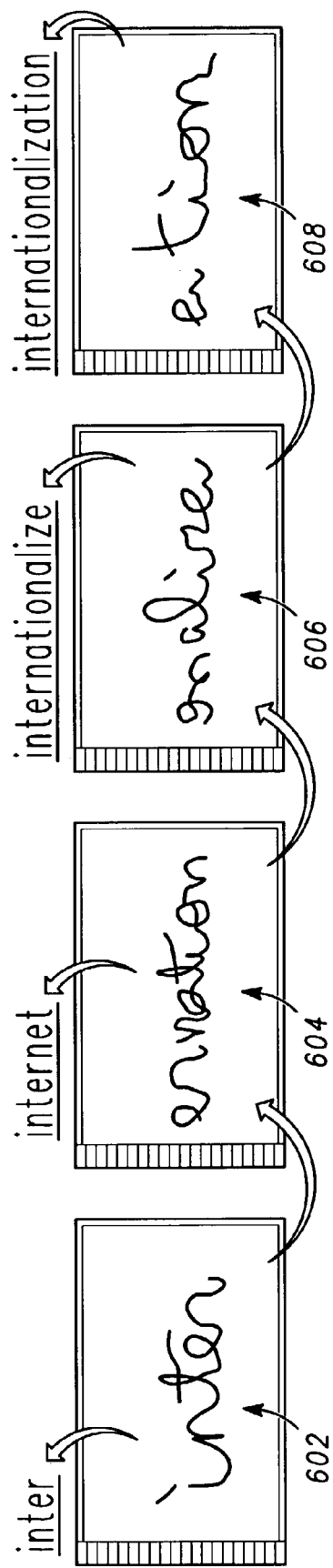
FIG. 6 represents a series of screens representing a second preferred embodiment in accordance with the present invention.

Referring to FIG. 6, a series of screens is shown representing a second preferred embodiment in which long words are entered into the device 100. Entry of long words such as "internationalization" (20 characters) is facilitated since each long word is written portion-by-portion. The word "internationalization" can be entered by collecting a first portion "inter" 602, then collecting a second portion "nation" 604 after a first timeout condition, next collecting a third portion "aliza" 606 after a second timeout condition, and thereafter collecting a fourth portion "tion" 608 after a third timeout condition. Even though the long word is entered in portions, the device 100 understands the relationship of these portions and combines them appropriately, e.g. forms a processed version 610 of a single word. Referring back to FIG. 4, the second preferred embodiment operates substantially similar to the first preferred embodiment. However, for the second preferred embodiments, the processor 206 performs the additional step of shifting the previous data input and/or previous processed information within the first display area 224 at step 426. Of course, the second preferred embodiment should not be considered to be limited to shifting of previous data input or previous processed information. Other examples include, but are not limited to, shrinking and/or reformatting data input or processed information.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for editing processed data input, for a portable electronic device having a display area and a memory portion, comprising:
   collecting a first data input corresponding to a first part of a word;
   detecting an input delay;
   storing the first data input in the memory portion in response to detecting the input delay;
   receiving an undo command input;
   retrieving the first data input from the memory portion in response to receiving the undo command input;
   collecting a second data input corresponding to a second part of the word;
   appending the second data input to the first data input to produce a modified data input; and
   processing the modified data input to produce modified processed information.

2. The method of claim 1, further comprising the step of processing the first data input, in response to the step of detecting, to produce the processed version of the first data input.

3. The method of claim 1, wherein the step of collecting the first data input includes the step of providing the first data input at the display area.

4. The method of claim 1, wherein the step of detecting the input delay includes the step of determining that a predetermined time period of inactivity for collecting the first data input has been exceeded.

5. The method of claim 1, further comprising the step of activating an undo actuator in response to the step of detecting.

6. The method of claim 5, further comprising the step of inactivating the undo actuator in response to the step of receiving.

7. The method of claim 1, further comprising a step of providing the first data input or a processed version of the first data input at a second display area after the step of detecting an input delay.

8. The method of claim 7, further comprising a step of removing the first data input or the processed version of the first data input from the second display area after the step of receiving an undo command input.

9. The method of claim 1, wherein the step of retrieving includes the step of shifting the first data input within the display area.

* * * * *